United States Patent Office 2,792,137
Patented May 14, 1957

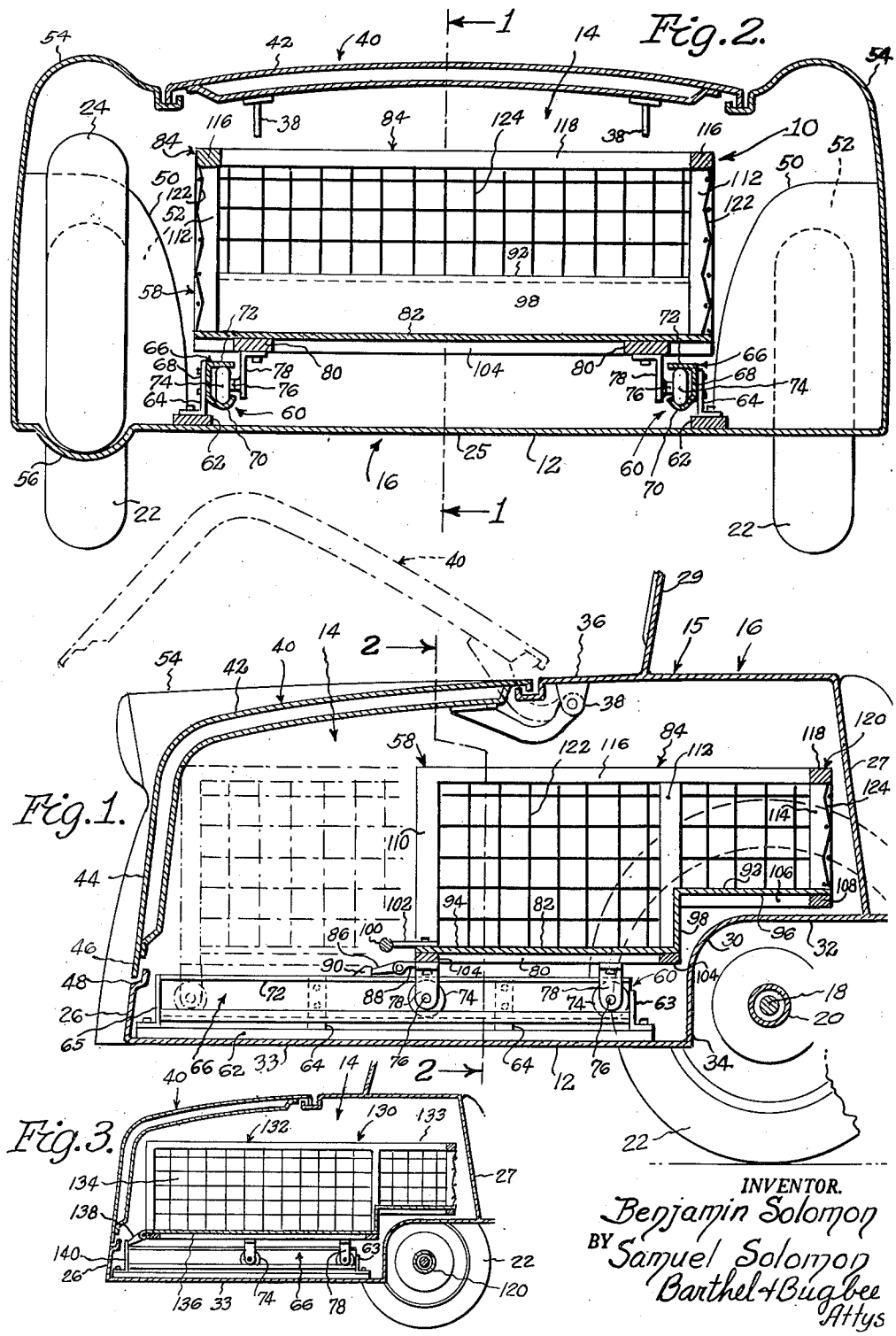

2,792,137

MOVABLE LUGGAGE HOLDER FOR AUTOMOBILE TRUNK COMPARTMENTS

Benjamin Solomon and Samuel Solomon, Detroit, Mich.

Application October 20, 1955, Serial No. 541,817

1 Claim. (Cl. 214—83.34)

This invention relates to vehicles and, in particular, to luggage carrying arrangements for such vehicles.

Hitherto, vehicles have generally been provided with luggage-carrying compartments for the accommodation of all types of baggage, parcels, market purchases and the like. In motor vehicles of the past, these luggage compartments have been of such depth that all parts thereof were at arm's length and accessible with ease for loading or unloading luggage. In recent years, however, the luggage compartments of passenger automobiles have become of such length that a person standing behind the rear bumper cannot reach the forward portion of the compartment without bending over or actually getting on his knees within the compartment itself. As a consequence, the loading and unloading of the luggage compartments of modern passenger automobiles has been difficult and inconvenient, particularly as regards the inaccessible forward portions thereof. The present invention provides means for facilitating the loading and unloading of a vehicle luggage compartment by rendering all portions thereof easily and conveniently accessible.

Accordingly, one object of this invention is to provide a movable luggage holder mounted within the luggage compartment and adapted to be moved rearwardly for loading and unloading of luggage, thereby bringing the forward and otherwise inaccessible portion of the luggage compartment within easy and comfortable reach of a person standing behind or beside the vehicle.

Another object is to provide a movable luggage holder of the foregoing character which during transit occupies the forward portion of the luggage compartment, with the rearward portion accommodating luggage which is packed directly therein by being within easy reach, this directly-packed luggage being first unloaded, after which the forwardly-located luggage holder is moved to the rear of the luggage compartment and also unloaded.

Another object is to provide a modified movable luggage holder of the foregoing character which occupies both the forward and rearward portions of the luggage compartment and is movable rearwardly so as to extend outside the luggage compartment for convenience and accessibility of loading and unloading.

Other objects and advantages of the invention will become apparent during the course of the following description of the accompanying drawing, wherein:

Figure 1 is a central longitudinal section taken along the line 1—1 in Figure 2, through a motor vehicle luggage compartment equipped with a movable luggage holder normally occupying the forward portion thereof during transit, with its alternate rearward position for loading and unloading shown in dotted lines;

Figure 2 is a cross-section taken along the line 2—2 in Figure 1; and

Figure 3 is a longitudinal section similar to Figure 1, but upon a reduced scale and showing a modified movable luggage holder occupying both the forward and rearward portions of the vehicle luggage compartment.

Referring to the drawing in detail, Figures 1 and 2 show a movable luggage holder, generally designated 10, as mounted on the floor 12 of the so-called luggage or trunk compartment 14 of the body 15 of a motor vehicle, generally designated 16, such as a conventional passenger automobile. The latter is shown only in part, and is of the usual construction with the usual rear axle 18 in the rear axle housing 20 and equipped with the usual rear wheels 22. The spare tire or spare wheel 24 has been shown as mounted at the left-hand side of the interior of the luggage compartment 14, it being understood that it can be placed in the bottom portion 25 of the luggage compartment 14 or mounted adjacent and outside the rear wall 26 of the vehicle body 15 which is provided with the usual rear seat bulkhead 27 and rear passenger compartment wall 29. In order to accommodate the up-and-down movement of the wheels 22 and rear axle housing 20 on their conventional springs (not shown) there is provided a so-called kick-up or step portion 30 of the floor 12 including a forward higher level horizontal wall 32 separated from the rearward bottom wall portion 33 by a riser or vertical wall 34.

The luggage compartment 14, also sometimes called the trunk compartment, is provided with the usual rear deck 36 carrying hinges 38 connected to a lid 40 which is of angle longitudinal section with an approximately horizontal upper portion 42 and an approximately vertical rearward portion 44 terminating in a lower edge 46 received upon an offset sill or ledge 48 of the rearward wall 26. Bulkheads 50 ordinarily separate the luggage compartment 14 from the wheel spaces 52 under the fender portions 54, and a well 56 ordinarily receives the lower portion of the spare tire 24, the conventional supporting arrangement for which has been omitted in order to avoid complicating the disclosure.

The movable luggage holder 10 consists generally of a carriage 58 reciprocably supported and guided upon a guideway or supporting guide structure 60. The guideway 60 consists of a pair of elongated supporting bars 62 mounted in a fore-and-aft direction on the luggage compartment floor 12 and having upright angle side brackets 64 and forward and rearward end brackets 63 and 65 bolted thereto and in turn having elongated parallel tracks 66 riveted, welded or otherwise secured to the upright portions of the angle brackets 63, 64 and 65. The tracks 66 may be of any suitable shape, channel tracks of approximately J-shaped cross-section being shown for purposes of illustration. The channel tracks 66 have mid-portions 68 by which they are secured to the angle brackets 64, and lower trough-shaped portions 70 and upper horizontal retaining portions 72 for respectively guiding and retaining the rollers or wheels 74 by which the carriage 58 is reciprocably supported and guided.

The wheels or rollers 74 are rotatably mounted upon axles 76 which in turn are secured to the vertical portions of inverted angle brackets 78, the horizontal portions of which are bolted or otherwise secured to elongated upper supporting bars 80 secured to the bottom wall 82 of a luggage receptacle, generally designated 84, such as a wire netting basket. From Figure 1 it will be seen that the tracks 66 extend substantially the full length of the floor 12, whereas the angle brackets 78 are separated from one another by a much shorter distance. This construction permits the carriage 58 to be drawn rearwardly into the dotted line position of Figure 1 through a distance approximately equal to or slightly greater than the separation of the angle brackets 78, for convenience of loading or unloading. A latch 86 is pivoted to a latch bracket 88 mounted on one of the angle brackets 78 for engagement with a stop or keeper 90 (Figure 1) mounted on one of the tracks 66 for releasably locking the carriage 58 in position.

The luggage receptacle 84 as previously stated has a floor 82 which, however, like the floor 12 of the luggage compartment 14, is stepped as at 92 to provide a horizontal rearward portion 94 and a horizontal portion 96 separated from one another by a vertical riser 98. A handle 100 is also secured by handle brackets 102 to the luggage receptacle floor 82 to facilitate pushing the carriage 58 back and forth.

The luggage receptacle 84, in addition to the stepped floor 82, includes cross members 104 interconnecting the longitudinal members 80 beneath the rearward floor portion 94 and also includes upper longitudinal members 106 interconnected by a forward cross member 108 (Figure 1). Rising from the stepped floor 82 are receptacle frame uprights 110, 112 and 114 supporting horizontal upper longitudinal frame members 116 which are interconnected at their forward ends by a cross member 118. The sides and forward end of the framework, generally designated 120, thus provided are filled preferably by side and forward panels 122 and 124 respectively, preferably constructed of wire netting.

In the operation of the movable luggage holder 10, which has been installed in the above-described manner in the luggage compartment 14 of the automobile or other vehicle 16, let it be assumed that the carriage 18 has been moved to its forward or transit position by means of the handle 100 and locked in that position by the engagement of the pivoted latch 86 against the stop or keeper 90 (Figure 1). Let it be assumed that the owner of the vehicle 16 is going upon a trip or is otherwise to haul luggage or parcels which will fill not only the rearward part of the luggage compartment 14 but also the forward part thereof. To load the luggage or trunk compartment 14, the user unlocks and raises the lid 40, and swings it upward into its dotted line position where it is held by the conventional counter-balancing springs (not shown) of the hinges 38. The operator then lifts the latch 86 so as to swing it upward out of engagement with the stop or keeper 90 and, while holding it in its unlatched position, grasps the handle 100 and pulls the carriage 58 rearwardly while its wheels or rollers 74 roll rearwardly along the tracks 66 to the dotted line position shown in Figure 1. The end angle brackets 63 and 65 serve as stops limited the forward and rearward travel of the rollers 74.

With the carriage 58 in its rearward position adjacent the rear wall 26 of the luggage compartment 14, the user now has all portions thereof within easy arm's length reach. He is therefore enabled to load approximately one-half or more of the luggage or parcels into the receptacle 84 of the carriage 58 without straining himself or unduly bending over. When the receptacle 84 of the carriage 58 has been thus fully loaded, the user pushes the carriage 58 to its forward or solid line position of Figure 1, permitting the swinging latch 86 to drop behind the stop or keeper 90, locking the carriage 58 and its contents in its forward or transit position. The user then packs the remaining luggage or parcels into the rearward part of the luggage compartment 14 just vacated by the carriage 58 in its forward movement, after which he closes and locks the lid or cover 40 in the usual manner.

When he arrives at his destination, the user unloads the luggage compartment 14 by reversing the foregoing procedure, first unloading the luggage in the rearward or easily accessible part of the luggage compartment 14. When this has been done, he again releases the latch 86, pulls the carriage 58 rearwardly by means of the handle 100 to its dotted line position of Figure 1, and unloads the luggage or parcels in the luggage receptacle 84 of the carriage 58. When unloading has been completed, he pushes the carriage 58 into its forward position and locks it in place by means of the latch 86 against the stop or keeper 90.

The modified luggage holder, generally designated 130, shown in Figure 3 is generally similar in construction and arrangement to the luggage holder 10 of Figures 1 and 2, except that the luggage receptacle 132 on the carriage 133 occupies substantially the entire luggage compartment 14 by being provided with a rearward extension 134 having a floor extension 136 to which the latch 138 is pivotally connected. The tracks 66 are also high enough to permit the carriage 133 to pass over the wall 26. The extension floor 136 thus overhangs the tracks 66 rearwardly of the roller brackets 78 and rollers 74 so that when the carriage 133 is drawn rearwardly to its rearward position, the extension 34 of the luggage receptacle 132 passes rearwardly over the rearward wall 26 of the luggage compartment 14 and outwardly beyond the rear bumper (not shown) of the vehicle. The operator loads the entire luggage receptacle 130 by bringing the forward portion thereof parallel with and adjacent the rearward part of the compartment 14 immediately beneath the raised lid or cover 40 such as by inserting the luggage or parcels from the side of the vehicle. He then loads the rearward extension 134 of the luggage receptacle 132 from the rear while the carriage 133 is in its rearwardly-extended position. When this has been accomplished, the user pushes the carriage 133 forwardly to its transit position shown in Figure 3, locking it in position by the latch 138 against the stop 140 at the rearward end of one of the tracks 66.

What we claim is:

A movable luggage holder for facilitating the loading and unloading of a passenger automobile luggage compartment structure having a floor with an upwardly-stepped portion at the forward end thereof, comprising a carriage-supporting guide structure secured to said luggage compartment structure in a fore-and-aft direction within the luggage compartment structure and terminating short of the upwardly-stepped floor portion thereof, a carriage mounted on said guide structure for travel in a fore-and-aft direction between a forward transit position and a rearward loading position, and a luggage receptacle mounted on said carriage for travel therewith, said luggage receptacle having a rearwardly-disposed main portion and an upwardly-stepped forward portion extending forwardly from said main portion beyond the forward end of said guide structure and overhanging the upwardly-stepped floor portion.

References Cited in the file of this patent

UNITED STATES PATENTS

| | | |
|---|---|---|
| 2,094,401 | Girl | Sept. 28, 1937 |
| 2,284,419 | Greig | May 26, 1942 |
| 2,391,310 | Heller | Dec. 18, 1945 |
| 2,549,018 | Sarlo | Apr. 17, 1951 |

FOREIGN PATENTS

| | | |
|---|---|---|
| 197,756 | Switzerland | May 15, 1938 |
| 807,761 | Germany | July 2, 1951 |